(12) United States Patent
Hao et al.

(10) Patent No.: US 11,436,738 B1
(45) Date of Patent: Sep. 6, 2022

(54) ROCK STRATIFICATION IDENTIFICATION METHOD AND APPARATUS, DEVICE AND STORAGE MEDIUM

(71) Applicant: INSTITUTE OF GEOLOGY AND GEOPHYSICS, CHINESE ACADEMY OF SCIENCES, Beijing (CN)

(72) Inventors: Jin Hao, Beijing (CN); Jijin Yang, Beijing (CN); Guoliang Li, Beijing (CN); Runqing Zhou, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/728,935

(22) Filed: Apr. 25, 2022

(30) Foreign Application Priority Data

Mar. 9, 2022 (CN) .......................... 202210221224.X

(51) Int. Cl.
    *G06T 7/174* (2017.01)
(52) U.S. Cl.
    CPC .... *G06T 7/174* (2017.01); *G06T 2207/10081* (2013.01); *G06T 2207/30181* (2013.01)
(58) Field of Classification Search
    CPC .......... G06T 7/174; G06T 2207/10081; G06T 2207/30181
    See application file for complete search history.

(56) References Cited

U.S. PATENT DOCUMENTS

| 10,656,068 | B2* | 5/2020 | León Carrera et al. ..................... G01N 15/08 |
| 2010/0328313 | A1* | 12/2010 | Zamyatin ............. G06V 10/267 382/131 |

(Continued)

FOREIGN PATENT DOCUMENTS

| CN | 102621594 A | 8/2012 |
| CN | 102980902 A | 3/2013 |

(Continued)

OTHER PUBLICATIONS

Johnson, Thorsten RC. "Dual-energy CT-Technical background." Multislice CT. Springer, Berlin, Heidelberg, 2009. 65-73. (Year: 2009).*

(Continued)

*Primary Examiner* — Katrina R Fujita
(74) *Attorney, Agent, or Firm* — J.C. Patents

(57) ABSTRACT

The present application belongs to the technical field of oil and gas exploration and development, and specifically provides a rock stratification identification method and apparatus, a device and a storage medium. The method includes: acquiring multiple sets of CT slice images of a rock, where each set of the CT slice images include a first CT slice image and a second CT slice image, the first CT slice image and the second CT slice image are acquired by scanning a same depth section of the rock, scanning energy corresponding to the first CT slice image is different form scanning energy corresponding to the second CT slice image; determining multiple dual energy indices of the rock according to the multiple sets of CT slice images; and determining a rock stratification according to the multiple dual energy indices, which can identify stratification of a large-scale rock by using CT.

11 Claims, 6 Drawing Sheets

(56) References Cited

U.S. PATENT DOCUMENTS

| | | | |
|---|---|---|---|
| 2013/0182819 A1* | 7/2013 | Dvorkin | G01N 23/046 378/5 |
| 2013/0259190 A1* | 10/2013 | Walls | G01N 33/2823 382/109 |
| 2013/0301794 A1* | 11/2013 | Grader | G01N 23/087 378/5 |
| 2014/0119497 A1* | 5/2014 | Guzman | G01N 33/241 250/255 |
| 2014/0255694 A1* | 9/2014 | Bakke | C22B 26/10 209/552 |
| 2015/0071400 A1 | 3/2015 | Popescu | |
| 2016/0194940 A1* | 7/2016 | Andersen | E21B 43/16 703/2 |
| 2016/0306074 A1* | 10/2016 | Andersen | G06F 30/20 |
| 2017/0004650 A1* | 1/2017 | Caliskan | E21B 25/00 |
| 2017/0039735 A1* | 2/2017 | Can | G01N 33/24 |
| 2018/0106708 A1 | 4/2018 | Siebrits | |
| 2018/0156741 A1 | 6/2018 | Kang | |
| 2019/0192424 A1 | 6/2019 | Garibyan | |
| 2021/0356623 A1* | 11/2021 | Shan | G06N 7/023 |

FOREIGN PATENT DOCUMENTS

| | | |
|---|---|---|
| CN | 103198363 A | 7/2013 |
| CN | 104169714 A | 11/2014 |
| CN | 106373100 A | 2/2017 |
| CN | 106530335 A | 3/2017 |
| CN | 106950231 A | 7/2017 |
| CN | 107595311 A | 1/2018 |
| CN | 107992901 A | 5/2018 |
| CN | 109100775 A | 12/2018 |
| CN | 109883922 A | 6/2019 |
| CN | 110599473 A | 12/2019 |
| CN | 111551992 A | 8/2020 |
| CN | 113496498 A | 10/2021 |
| CN | 113607618 A | 11/2021 |
| CN | 114004261 A | 2/2022 |
| CN | 114113169 A | 3/2022 |

OTHER PUBLICATIONS

Boizet et al. "Contribution of dual-energy computed tomography in the differentiation of illicit drugs." Archiwum Medycyny Sądowej i Kryminologii/Archives of Forensic Medicine and Criminology 70.4 (2020): 235-241. (Year: 2020).*

Tsuchiyama et al. "Analytical dual-energy microtomography: A new method for obtaining three-dimensional mineral phase images and its application to Hayabusa samples." Geochimica et Cosmochimica Acta 116 (2013): 5-16. (Year: 2013).*

First Office Action of the priority application CN202210221224.X.

Notice of Allowance of the priority application CN202210221224.X.

NPL1:"An Improved Method of Calculating Lost Gas Content of Shale Gas", GeoScience, vol. 29, No. 6, Dec. 2015, pp. 1475-1482.

NPL2: "Application value of dual-source CT in the analysis of urinary calculi in children", International Journal of Surgery, 2021, 48(06), pp. 391-395.

NPL3: "Clinical study on the value of rapid kV-switching dual energy CT combined with metabolic level in the diagnosis and treatment of urinary calculi", by Yuanxing Yang, Master's Dissertation of Tianjin Medical University, May 26, 2020.

NPL4: "Rock Porosity Quantification by Dual-Energy X-Ray", Author: A.P. Teles I. Lima R.T. Lopes PII: S0968-4328(16)30013-0 DOI: http://dx.doi.org/doi:10.1016/j.micron.2016.02.004 Reference: JMIC 2281NPL4: "Rock Porosity Quantification by Dual-Energy X-Ray".

* cited by examiner

ROCK STRATIFICATION IDENTIFICATION METHOD AND APPARATUS, DEVICE AND STORAGE MEDIUM

CROSS-REFERENCE TO RELATED APPLICATION

This application claims priority to Chinese Patent Application No. 202210221224.X, filed on Mar. 9, 2022, which is hereby incorporated by reference in its entirety.

TECHNICAL FIELD

The present disclosure relates to the technical field of oil and gas exploration and development and, in particular, to a rock stratification identification method and apparatus, a device and a storage medium.

BACKGROUND

Sedimentary rock is composed of layers of rocks, stratifications of different rocks can reflect deposition and diagenetic process of different strata. Sedimentary rock contains vast minerals. By accurately identifying stratification of sedimentary rock, we can effectively judge the stratification rich in oil and gas in sedimentary rock, thereby improving the efficiency of oil and gas exploration and development.

In related technologies, rock stratification can be identified by composition and structural characteristics of the rock. Specifically, the rock stratification can be identified by using computed tomography (CT). However, the analysis range of micron CT is small, which can only identify stratification of a small-scale rock, but cannot identify stratification of a large-scale rock.

SUMMARY

The present application provides a rock stratification identification method and apparatus, a device and a storage medium, which can identify stratification of a large-scale rock by using CT.

In a first aspect, the present application provides a rock stratification identification method which includes:

acquiring multiple sets of computed tomography (CT) slice images of a rock, where each set of the CT slice images include a first CT slice image and a second CT slice image, the first CT slice image and the second CT slice image are acquired by scanning a same depth section of the rock, scanning energy corresponding to the first CT slice image is different form scanning energy corresponding to the second CT slice image;

determining multiple dual energy indices of the rock according to the multiple sets of CT slice images; and determining a rock stratification according to the multiple dual energy indices.

In a possible implementation, for any set of the CT slice images, the determining multiple dual energy indices of the rock according to the multiple sets of CT slice images includes:

determining a first average CT value of the first CT slice image;

determining a second average CT value of the second CT slice image; and determining a dual energy index of the rock according to the first average CT value and the second average CT value.

In a possible implementation, the determining the dual energy index of the rock according to the first average CT value and the second average CT value includes:

determining a difference value between the first average CT value and the second average CT value;

determining an added value of the first average CT value and the second average CT value; and determining the dual energy index of the rock according to the difference value and the added value.

In a possible implementation, the dual energy index of the rock conforms to the following formula:

$$DEI_i = \frac{CTL_i - CTH_i}{CTL_i + CTH_i + 2000} \times 10^m$$

where the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

In a possible implementation, the determining the rock stratification according to the multiple dual energy indices includes:

determining a dual energy curve according to the multiple dual energy indices; and determining the rock stratification according to the dual energy curve.

In a possible implementation, the determining the rock stratification according to the dual energy curve includes:

acquiring a rock image of the rock;

determining a boundary value of the rock stratification according to the dual energy curve and the rock image; and determining the rock stratification according to the boundary value of the rock stratification.

In a possible implementation, the determining the boundary value of the rock stratification according to the dual energy curve and the rock image includes:

determining multiple peak values according to the dual energy curve;

determining multiple grayscale values according to the rock image; and determining the boundary value of the rock stratification according to the multiple peak values and the multiple grayscale values.

In a possible implementation, the method further includes:

determining a boundary value of a target stratification according to the boundary value of the rock stratification; and determining the target stratification according to the boundary value of the target stratification, where the target stratification is stratification where mineral resources are stored.

In a second aspect, the present application provides a rock stratification identification apparatus which includes: an acquiring module, a first determining module and a second determining module, where the acquiring module is configured to acquire multiple sets of computed tomography (CT) slice images of a rock, where each set of the CT slice images include a first CT slice image and a second CT slice image, the first CT slice image and the second CT slice image are acquired by scanning a same depth section of the rock, scanning energy corresponding to the first CT slice image is different form scanning energy corresponding to the second CT slice image;

the first determining module is configured to determine multiple dual energy indices of the rock according to the multiple sets of CT slice images; and the second determining module is configured to determine a rock stratification according to the multiple dual energy indices.

In a possible implementation, for any set of the CT slice images, the first determining module is specifically configured to:

determine a first average CT value of the first CT slice image;

determine a second average CT value of the second CT slice image; and determine a dual energy index of the rock according to the first average CT value and the second average CT value.

In the possible implementation, the first determining module is specifically configured to:

determine a difference value between the first average CT value and the second average CT value;

determine an added value of the first average CT value and the second average CT value; and determine the dual energy index of the rock according to the difference value and the added value.

In the possible implementation, the dual energy index of the rock conforms to the following formula:

$$DEI_i = \frac{CTL_i - CTH_i}{CTL_i + CTH_i + 2000} \times 10^m$$

where the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

In the possible implementation, the second determining module is specifically configured to:

determine a dual energy curve according to the multiple dual energy indices; and determine the rock stratification according to the dual energy curve.

In the possible implementation, the second determining module is specifically configured to:

acquire a rock image of the rock;

determine a boundary value of the rock stratification according to the dual energy curve and the rock image; and determine the rock stratification according to the boundary value of the rock stratification.

In the possible implementation, the second determining module is specifically configured to:

determine multiple peak values according to the dual energy curve;

determine multiple grayscale values according to the rock image; and determine the boundary value of the rock stratification according to the multiple peak values and the multiple grayscale values.

In the possible implementation, the apparatus further includes a third determining module, and the third determining module is specifically configured to:

determine a boundary value of a target stratification according to the boundary value of the rock stratification; and determine the target stratification according to the boundary value of the target stratification, where the target stratification is stratification where mineral resources are stored.

In a third aspect, the present application provides an electrical device which includes: a processor and a memory;

where the memory stores computer-executable instructions; and the computer-executable instructions stored in the memory are executed by the processor to enable the processor to perform the rock stratification identification method according to any one of the first aspect.

In a fourth aspect, the present application provides a computer-readable storage medium, where the computer-readable storage medium stores computer-executable instructions which, when executed by a processor, are used to implement the rock stratification identification method according to any one of the first aspect.

In a fifth aspect, the present application provides a computer program product which includes a computer program, and the computer program, when executed by a processor, can implement the rock stratification identification method according to any one of the first aspect.

The present application provides the rock stratification identification method and apparatus, the device and the storage medium. The multiple sets of CT slice images are firstly acquired; then multiple dual energy indices of the rock are determined according to the multiple sets of CT slice images; and finally a rock stratification is determined according to the multiple dual energy indices and a rock image. By introducing the dual energy index, large-scale and high-resolution rock stratification identification can be effectively realized.

BRIEF DESCRIPTION OF DRAWINGS

The accompanying drawings, which are incorporated in and constitute a part of this description, illustrate embodiments consistent with the present application and together with the description to explain the principles of the present application.

Specific embodiments of the present application have been illustrated by the above-mentioned drawings, and will be described in more detail hereinafter. These drawings and descriptions are not intended to limit the scope of the concepts of the present application in any way, but to illustrate the concepts of the present application to those skilled in the art by referring to specific embodiments.

DESCRIPTION OF EMBODIMENTS

In order to make purpose, technical solutions and advantages of the present application clearer, the technical solutions in the embodiments of the present application will be clearly and completely described hereinafter combined with the embodiments of the present application. Obviously, the described embodiments are some of the embodiments of the present application, but not all of the embodiments. Based on the embodiments of the present application, all other embodiments obtained by those of ordinary skill in the art without creative work fall within the protection scope of the present application.

The CT used in the present application can be medical CT or industrial CT, and the axial resolution can be 0.1-100 mm.

Figure 1:
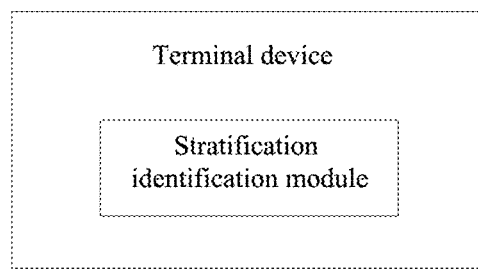
FIG. 1 is a schematic diagram of an application scenario provided by an embodiment of the present application.

For ease of understanding, the following describes an application scenario to which an embodiment of the present application is applicable with reference to FIG. 1.

FIG. 1 is a schematic diagram of an application scenario provided by an embodiment of the present application. Please refer to FIG. 1, a stratification identification module may be provided in a terminal device. When it is necessary to identify rock stratification, a rock image and a CT slice image of a rock can be input into the terminal device, and the terminal device can identify the rock stratification through the stratification identification module to determine how much stratification the rock has.

In the related art, the rock stratification can be identified by using micron CT. The resolution of the micron CT is high, which can accurately reflect composition and structural characteristics of rocks. However, the analysis range of micron CT is small, and it can only identify stratification of a small-scale rock and cannot identify stratification of a large-scale rock.

In order to solve the above technical problems, in the present application, multiple sets of CT slice images are acquired through CT with different energies, and dual energy indices can be determined according to the multiple sets of CT slice images. By introducing the dual energy index, large-scale and high-resolution rock stratification identification can be effectively realized.

Hereinafter, the technical solutions shown in the present application will be described in detail through specific embodiments. It should be noted that the following embodiments may exist independently or may be combined with each other, and same or similar content will not be repeated in different embodiments.

Figure 2:
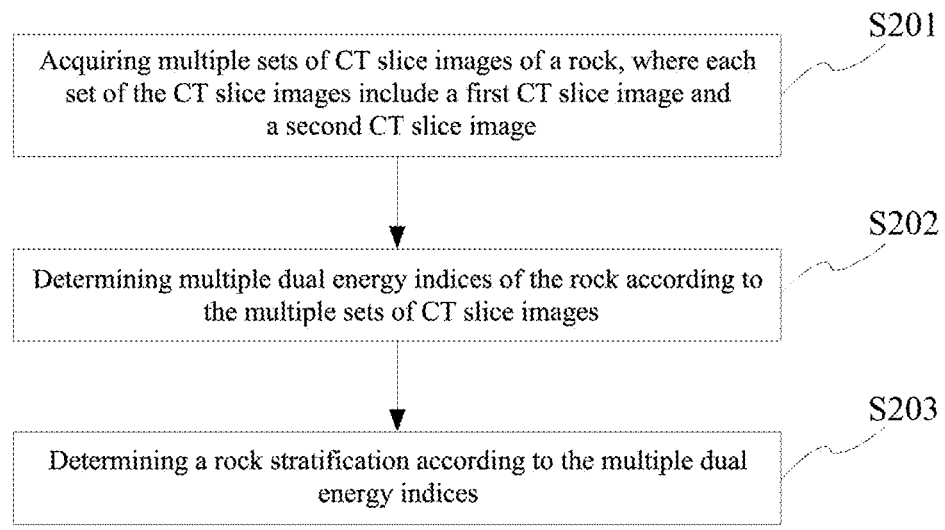
FIG. 2 is a first schematic flowchart of a rock stratification identification method provided by an embodiment of the present application.

FIG. 2 is a first schematic flowchart of a rock stratification identification method provided by an embodiment of the present application. Referring to FIG. 2, the method includes the following.

S201: acquiring multiple sets of CT slice images of a rock, where each set of the CT slice images include a first CT slice image and a second CT slice image.

The executive entity of the embodiment of the present application may be a terminal device, or a rock stratification identification apparatus set in the terminal device. The rock stratification identification apparatus may be implemented by software, or by a combination of software and hardware.

The first CT slice image and the second CT slice image are acquired by scanning a same depth section of the rock.

Scanning energy corresponding to the first CT slice image is different form scanning energy corresponding to the second CT slice image.

For example, the scanning energy corresponding to the first CT slice image is a voltage less than 100 kV, such as 80 kV; and the scanning energy corresponding to the second CT slice image is a voltage greater than 100 kV, such as 140 kV.

For a same rock, the number of slice images with the same scanning energy can be determined by the depth of the rock and the axial resolution of the CT.

For example, for a rock core with a depth of 1 meter, the axial resolution of the CT is 0.8 mm, then the number of slice images with the same scanning energy is 1m÷0.8mm=1250.

Multiple CT slice images with the same scanning energy can form a three-dimensional CT image.

S202: determining multiple dual energy indices of the rock according to the multiple sets of CT slice images.

The dual energy index can reflect the difference in the atomic number of rocks.

For any set of CT slice images, multiple dual energy indices of the rock can be determined according to multiple sets of CT slice images in the following way:

determining a first average CT value of the first CT slice image; determining a second average CT value of the second CT slice image; and determining a dual energy index of the rock according to the first average CT value and the second average CT value.

The CT value can be a brightness value of a pixel.

Each pixel in the CT slice image has a CT value.

An average CT value of a CT slice image refers to an average value of the CT values of all pixels in the CT slice image. For example, if the CT slice image has 256 pixels, the average CT value of the CT slice image=$(CT_1+CT_2+CT_3+\ldots+CT_{256}) \div 256$.

The CT value can be a comprehensive reflection of material density and atomic number.

S203: determining a rock stratification according to the multiple dual energy indices.

The rock stratification can be determined according to multiple dual energy indices in the following way: determining a dual energy curve according to the multiple dual energy indices; and determining the rock stratification according to the dual energy curve.

The dual energy curve is a curve drawn with the dual energy index as the abscissa and the depth of the rock as the ordinate.

In the embodiment as illustrated in FIG. 2, the multiple sets of CT slice images are firstly acquired; then multiple dual energy indices of the rock are determined according to the multiple sets of CT slice images; and finally rock stratification is determined according to the multiple dual energy indices. By introducing the dual energy index, large-scale and high-resolution rock stratification identification can be effectively realized.

On the basis of any of the above-mentioned embodiments, the above rock stratification identification method will be described in detail hereinafter with reference to the embodiment illustrated in FIG. 3.

Figure 3:
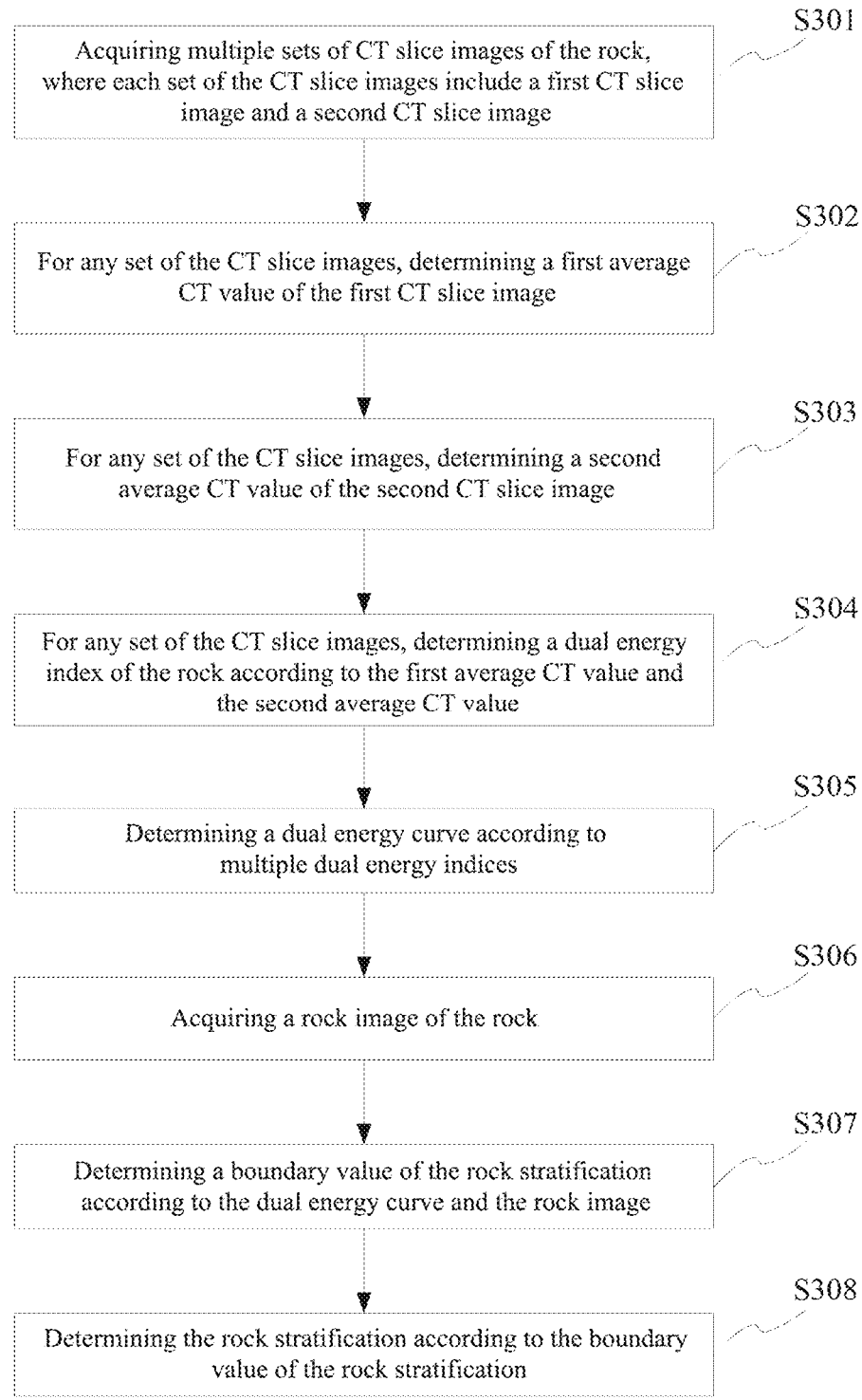
FIG. 3 is a second schematic flowchart of a rock stratification identification method provided by an embodiment of the present application.

FIG. 3 is a second schematic flowchart of a rock stratification identification method provided by an embodiment of the present application. Please refer to FIG. 3, the method may include:

S301: acquiring multiple sets of CT slice images of the rock, where each set of the CT slice images include a first CT slice image and a second CT slice image.

It should be noted that, for the execution process of S301, reference may be made to the execution process of S201, which will not be repeated here.

S302: for any set of the CT slice images, determining a first average CT value of the first CT slice image.

It should be noted that, for the execution process of S302, reference may be made to the execution process of S202, which will not be repeated here.

S303: for any set of the CT slice images, determining a second average CT value of the second CT slice image.

It should be noted that, for the execution process of S303, reference may be made to the execution process of S202, which will not be repeated here.

S304: for any set of the CT slice images, determining a dual energy index of the rock according to the first average CT value and the second average CT value.

The dual energy index of the rock can be determined according to the first average CT value and the second average CT value in the following way: determining a difference value between the first average CT value and the second average CT value; determining an added value of the first average CT value and the second average CT value; and determining the dual energy index of the rock according to the difference value and the added value.

For example, the dual energy index of the rock conforms to the following formula:

$$DEI_i = \frac{CTL_i - CTH_i}{CTL_i + CTH_i + 2000} \times 10^m$$

where the $DEI_i$ is the dual energy index when a depth of the rock is i; the $CTL_i$, is the first average CT value when the depth of the rock is i; the $CTH_i$ is the second average CT value when the depth of the rock is i; and the m is a constant, for example, m can be 3, but is not limited to 3.

S305: determining a dual energy curve according to multiple dual energy indices.

It should be noted that, for the execution process of S305, reference may be made to the execution process of S203, which will not be repeated here.

S306: acquiring a rock image of the rock.

The rock can be a meter-scale borehole rock core.

The meter-scale borehole rock core refers to an underground rock with meter as the length measurement unit that can be obtained from the ground through drilling technology, and can refer to a full-diameter rock core stored in a rock core library.

The rock image can be an image that reflects the change of the rock in a depth direction, can be a rock core photo, or can be a CT longitudinal section image.

The CT longitudinal section image may be an XZ-YZ section image of a three-dimensional CT image in a three-dimensional coordinate system.

S307: determining a boundary value of the rock stratification according to the dual energy curve and the rock image.

The boundary value of the rock stratification can be determined according to the dual energy curve and the rock image in the following way: determining multiple peak values according to the dual energy curve; determining multiple grayscale values according to the rock image; and determining the boundary value of the rock stratification according to the multiple peak values and the multiple grayscale values.

The peak value can be a top peak value or a half peak value.

Figure 4:
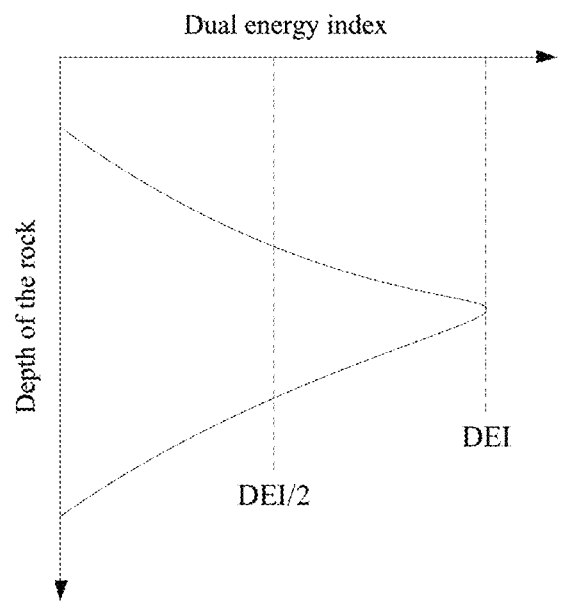
FIG. 4 is a schematic diagram of a peak of a dual energy curve provided by an embodiment of the present application.

For ease of understanding, the following describes peak values of the dual energy curve of the embodiment of the present application with reference to FIG. 4.

FIG. 4 is a schematic diagram of a peak of a dual energy curve provided by an embodiment of the present application. Please refer to FIG. 4. In a peak of a dual energy curve, the peak value can be either a top peak value DEI of the peak, or a half-peak DEI/2 of the peak.

The apparent black-and-white changes of stratification on rock images can be characterized by changes in dual energies on the dual energy curve. For the stratification that cannot be distinguished finely on the rock image, it can be distinguished according to the dual energy curve.

S308: determining the rock stratification according to the boundary value of the rock stratification.

The boundary value of the rock stratification can distinguish different rock stratification.

There can be various types of rock stratifications, and there can be multiple stratifications for each type of rock. For example, if there are N boundary values of rock stratifications, the types of rock stratifications are N−1, and for any one of the rock stratifications, the number of the boundary value is more than or equal to 1.

In the embodiment illustrated in FIG. 3, multiple sets of CT slice images of the rock are first acquired, where each set of the CT slice images include a first CT slice image and a second CT slice image; for any set of the CT slice images, a first average CT value of the first CT slice image and a second average CT value of the second CT slice image are determined, and a dual energy index of the rock is determined according to the first average CT value and the second average CT value; a dual energy curve is determined according to multiple dual energy indices; a rock image of the rock is acquired and a boundary value of the rock stratification is determined according to the dual energy curve and the rock image; and the rock stratification is finally determined according to the boundary value of the rock stratification. By introducing the dual energy index, large-scale and high-resolution rock stratification identification can be effectively realized.

The embodiments illustrated in FIGS. 2-4 illustrate a rock stratification identification method. When the rock stratification is identified, it can be further determined that which stratifications are rich in minerals. Specifically, the following methods can be utilized: determining a boundary value of a target stratification according to the boundary value of the rock stratification; and determining the target stratification according to the boundary value of the target stratification. The target stratification is stratification where mineral resources are stored.

For example, if there are 5 rock stratification boundary values, which are 6, 23, 47, 64, and 70, and the target stratification boundary value is 47, then the stratification with a dual energy index less than 47 is classified as target stratification.

Target stratification boundary values can be determined using other existing techniques.

For ease of understanding, the rock stratification identification method is described in detail hereinafter with reference to specific embodiments.

Step 1: dual energy scanning imaging, using CT to perform high-energy scanning and low-energy scanning on a meter-scale borehole rock core to obtain a high-energy CT three-dimensional image and a low-energy CT three-dimensional image, respectively.

Specifically, high-energy scanning and low-energy scanning are performed on meter-scale borehole rock core with a depth i of 0-1 m using Philips spiral CT. The high-energy scanning voltage is 140 kV, and the low-energy scanning voltage is 80 kV, the axial resolution of the CT is 0.8 mm, and 1250 high-energy CT slice images and 1250 low-energy CT slice images are obtained. 1250 high-energy CT slice images can form a high-energy CT image, and 1250 low-energy CT slice images can form a low-energy CT image.

Figure 5:
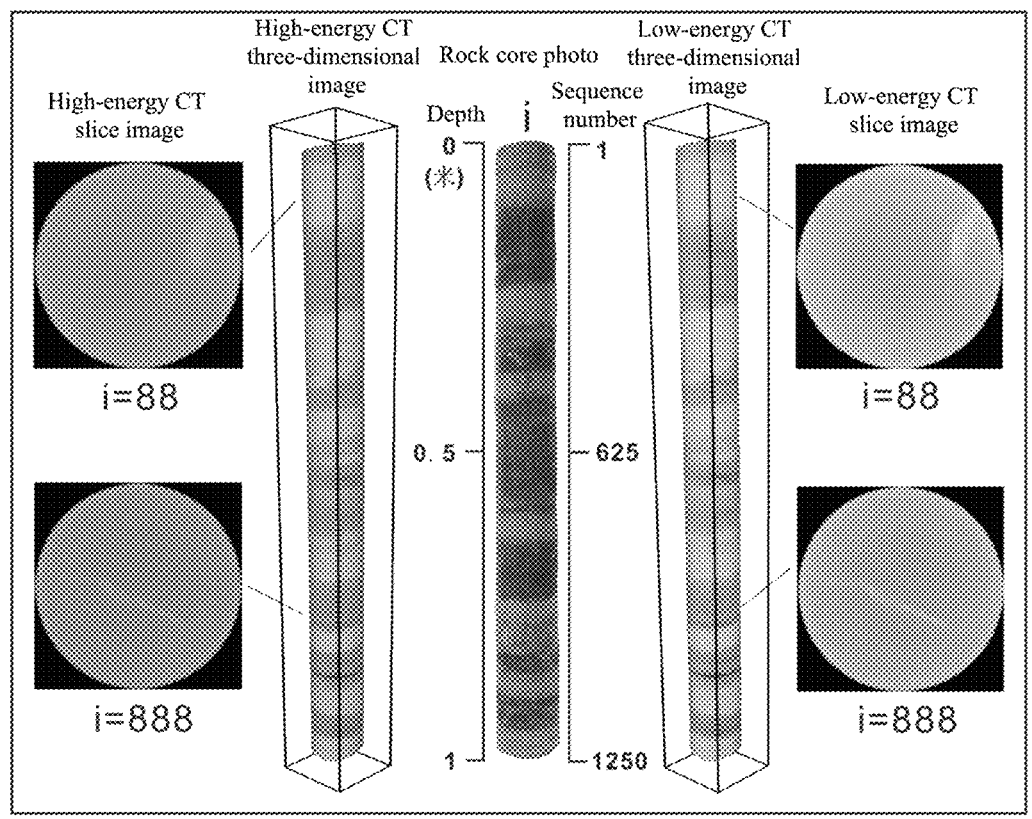
FIG. 5 is a schematic diagram of dual energy CT imaging of a meter-scale borehole rock core provided by an embodiment of the present application.

FIG. 5 is a schematic diagram of dual energy CT imaging of a meter-scale borehole rock core provided by an embodiment of the present application. Please refer to FIG. 1, which includes a high-energy CT three-dimensional image, a low-energy CT three-dimensional image, high-energy CT slice images, and low-energy CT slice images. Taking the rock core image as a reference, the slice images are sorted according to the depth of the rock core and the number of slice images. FIG. 5 shows the high-energy CT slice images and low-energy CT slice images with slice sequence numbers i of 88 and 888, respectively.

The rock core depth corresponding to each slice sequence number can be determined according to the total rock depth and the total number of slice images. For example, the rock core depth corresponding to the slice sequence number i=88 is 1000 mm÷1250*88=70.4 mm.

Step 2: average CT value calculation.

1250 high-energy CT slice images can be obtained through 140 kV voltage scanning. The black-and-white degree in the CT slice images is represented by the CT value. The CT slice image is a vector diagram with coordinates, and each coordinate has its own CT value. Image processing software or the self-compiled algorithm are used to average the CT values of all coordinates in the CT slice with a depth (or sequence number) i to obtain the average CT value of high-energy CT slices with a depth (or sequence number) i, denoted as $CTH_i$. Similarly, 1250 low-energy CT slice images can be obtained through 80 kV voltage scanning, and the average CT value of low-energy CT slices with depth (or sequence number) i can also be obtained, denoted as $CTL_i$.

Step 3: dual energy index calculation.

The dual energy index with a depth (or sequence number) i, namely $DEI_i$,
is calculated according to the following formula $$DEI_i = \frac{CTL_i - CTH_i}{CTL_i + CTH_i + 2000} \times 10^m,$$

the value of m herein is 3, but can also be other constants.

Step 4: determination of a boundary value of the rock stratification.

The dual energy index curve is drawn, using the dual energy index as the abscissa and the depth of the rock as the ordinate. The change law between the dual energy index curve and the stratification in the CT longitudinal section image (or rock core photo) is searched to determine the boundary value DEI[j] for categorizing the rock stratification.

Figure 6:
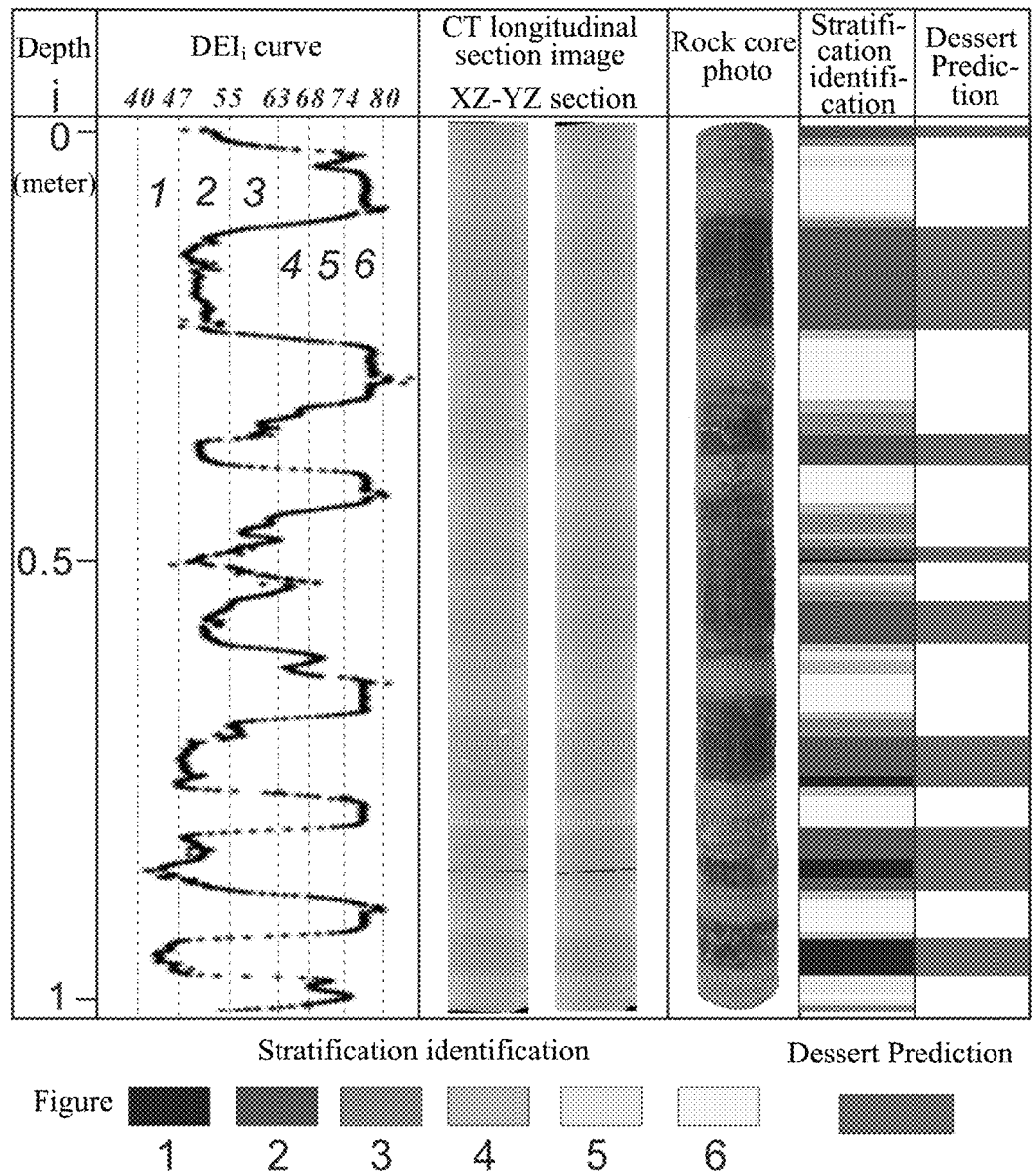
FIG. 6 is a schematic diagram of stratification identification and advantageous reservoir stratum prediction provided by an embodiment of the present application.

FIG. 6 is a schematic diagram of stratification identification and advantageous reservoir stratum prediction provided by an embodiment of the present application. Please refer to FIG. 6.

The change trend of the dual energy index curve and the change relationship of the stratification displayed in the CT longitudinal section image (or rock core photo) are observed. A continuous segment in which the value of the dual energy index curve fluctuates within a small range can be regarded as stratification, with the color displayed on the longitudinal section image and the rock core photo being almost the same. In this way, the boundary value DEI[j] for categorizing rock stratification is determined for the rock core with a depth of 0-1 m, and finally seven stratification boundary values are obtained, which are DEI[1]=40, DEI[2]=47, DEI[3]=55, DEI[4]=63, DEI[5]=68, DEI[6]=74, and DEI[7]=80.

Step 5: identification and display of the stratification.

In the embodiment illustrated in FIG. 6, a total of 6 types of stratifications are identified, of which $DEI_i \in [40, 47)$ is the first stratification, $DEI_i \in [47, 55)$ is the second stratification, and $DEI_i \in [55, 63)$ is the third stratification, $DEI_i \in [63, 68)$ is the fourth stratification, $DEI_i \in [68, 74)$ is the fifth stratification, and $DEI_i \in [74, 80)$ is the sixth stratification. And these 6 types of stratifications are marked and colored in the bar chart with 6 different colors, so as to realize the identification and direct display of 6 types of rock stratifications.

Step 6: advantageous reservoir stratum (target stratification) prediction.

The advantageous reservoir stratum boundary value DEI[a] is selected from the stratification boundary values DEI[j], the stratification with DEIi<DEI[a] is categorized into advantageous reservoir stratum, marked with a color and drawn in the bar chart, so as to realize advantageous reservoir stratum prediction and visual display.

For a mud shale reservoir stratum, the lower $DEI_i$ indicates the more organic matters and apertures in the reservoir stratum, which results in a more advantageous reservoir stratum; and for non-mud shale reservoir stratum, the lower $DEI_i$ reflects the more apertures in the reservoir stratum, which results in a more advantageous reservoir stratum.

In the embodiment illustrated in FIG. 6, it is considered that DEI[a]=DEI[2]=47, therefore, stratification 1 and stratification 2 are identified as advantageous reservoir stratums, marked with a color and drawn on the bar chart, as illustrated in a "Dessert Prediction" bar chart in FIG. 6.

In a physical sense, the CT value is a comprehensive reflection of material density and atomic number. The definition of the dual energy index reflects the difference in atomic numbers, that is, a lower the dual energy index reflects a lower atomic number of the material. For rock samples, the atomic numbers of apertures and organic matters are the lowest and are quite different from those of rock minerals. Intervals with more apertures and organic matters are often advantageous intervals for oil and gas enrichment. Therefore, the lower the dual energy index is, the better the reservoir stratum will be. In addition to apertures, mud shale reservoirs often contain more organic matters and organic pores. Therefore, for a mud shale reservoir stratum, the lower the dual energy index indicates the more organic matters and apertures in the reservoir stratum, and thus the reservoir stratum is conducive to the enrichment of oil and gas. For a non-mud shale reservoir stratum, such as a sandstone, a carbonate rock, a volcanic rock and other non-organic reservoir stratum, their main oil and gas reservoir space is apertures, which do not contain organic matters, the lower dual energy index, the more apertures in the reservoir stratum and the reservoir stratum is more advantageous.

Figure 7:
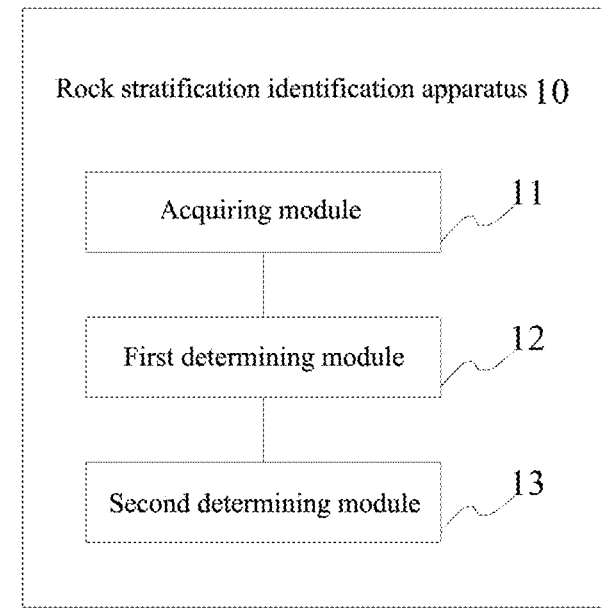
FIG. 7 is a first schematic structural diagram of a rock stratification identification apparatus provided by an embodiment of the present application.

FIG. 7 is a first schematic structural diagram of a rock stratification identification apparatus provided by an embodiment of the present application. Please refer to FIG. 7, the rock stratification identification apparatus 10 includes an acquiring module 11, a first determining module 12 and a second determining module 13, where, the acquiring module 11 is configured to acquire multiple sets of computed tomography (CT) slice images of a rock, where each set of the CT slice images include a first CT slice image and a second CT slice image, the first CT slice image and the second CT slice image are acquired by scanning a same depth section of the rock, scanning energy corresponding to the first CT slice image is different form scanning energy corresponding to the second CT slice image;

the first determining module 12 is configured to determine multiple dual energy indices of the rock according to the multiple sets of CT slice images; and the second determining module 13 is configured to determine a rock stratification according to the multiple dual energy indices.

In a possible implementation, for any set of the CT slice images, the first determining module 12 is specifically configured to:

determine a first average CT value of the first CT slice image;

determine a second average CT value of the second CT slice image; and determine a dual energy index of the rock according to the first average CT value and the second average CT value.

In a possible implementation, the first determining module 12 is specifically configured to:

determine a difference value between the first average CT value and the second average CT value;

determine an added value of the first average CT value and the second average CT value; and determine the dual energy index of the rock according to the difference value and the added value.

In a possible implementation, the dual energy index of the rock conforms to the following formula:

$$DEI_i = \frac{CTL_i - CTH_i}{CTL_i + CTH_i + 2000} \times 10^m$$

where the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

In a possible implementation, the second determining module 13 is specifically configured to:

determine a dual energy curve according to the multiple dual energy indices; and determine the rock stratification according to the dual energy curve.

In a possible implementation, the second determining module 13 is specifically configured to:

acquire a rock image of the rock;

determine a boundary value of the rock stratification according to the dual energy curve and the rock image; and determine the rock stratification according to the boundary value of the rock stratification.

In a possible implementation, the second determining module 13 is specifically configured to:

determine multiple peak values according to the dual energy curve;

determine multiple grayscale values according to the rock image; and determine the boundary value of the rock stratification according to the multiple peak values and the multiple grayscale values.

Figure 8:
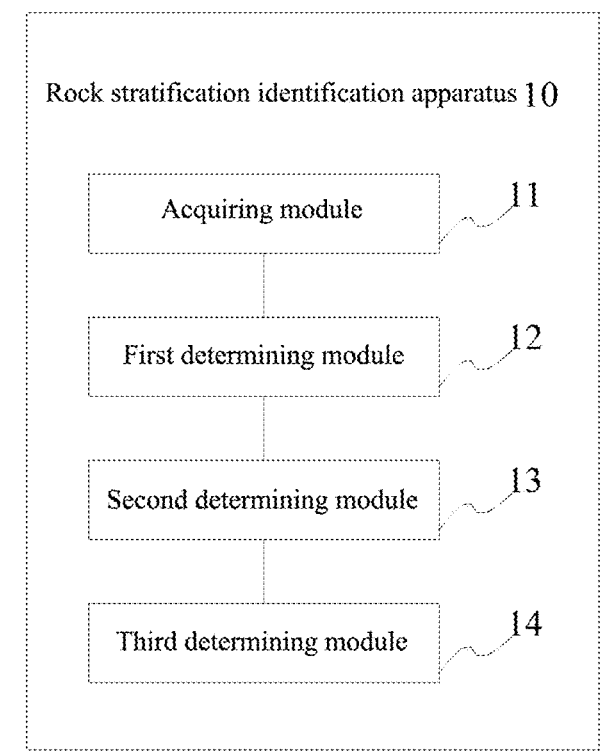
FIG. 8 is a second schematic structural diagram of a rock stratification identification apparatus provided by an embodiment of the present application.

FIG. 8 is a second schematic structural diagram of a rock stratification identification apparatus provided by an embodiment of the present application. Please refer to FIG. 8, the rock stratification identification apparatus 10 further includes a third determining module 14, where the third determining module 14 is specifically configured to:

determine a boundary value of a target stratification according to the boundary value of the rock stratification; and determine the target stratification according to the boundary value of the target stratification, where the target stratification is stratification where mineral resources are stored.

The rock stratification identification apparatus 10 provided by the present application can perform the technical solutions illustrated in the above embodiments of the rock stratification identification method, and the implementation principles and beneficial effects thereof are similar, which will not be repeated here.

Figure 9:
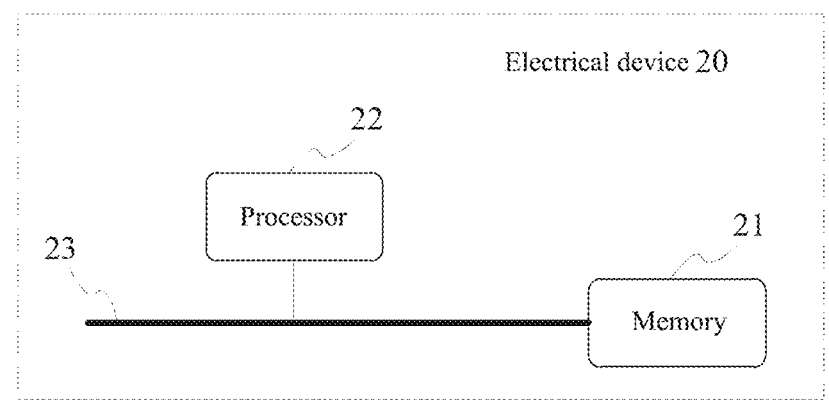
FIG. 9 is a schematic structural diagram of an electronic device provided by an embodiment of the present application.

FIG. 9 is a schematic structural diagram of an electronic device provided by an embodiment of the present application. Please refer to FIG. 9, the electrical device 20 includes: a memory 21 and a processor 22. Exemplarily, the memory 21 and the processor 22 are connected to each other through a bus 23.

The memory 21 stores computer-executable instructions; and the instructions stored in the memory 21 are executed by the processor 22 to enable the processor 22 to perform any one of the above rock stratification identification methods.

The electronic device illustrated in FIG. 9 can execute the technical solutions illustrated in the above-mentioned embodiments of the rock stratification identification method, and the implementation principles and beneficial effects thereof are similar, which will not be repeated here.

An embodiment of the present application further provides a computer-readable storage medium which stores computer-executable instructions, and the computer-executable instructions, when executed by a processor, are used to realize any one of the foregoing rock stratification identification methods.

An embodiment of the present application further provides a computer program product which includes a computer program, and the computer program, when executed by a processor, can implement the above-mentioned rock stratification identification methods.

Upon considering the description and practicing the invention disclosed herein, it is easy for those skilled in the art to arrive at other implementation solutions of the present application. The present application is intended to cover any variations, uses or adaptive changes of the present application that follow the general principles of the present application and include common knowledge or conventional technical means in the technical field not disclosed in the present application. The description and embodiments are regarded as exemplary only, and the true scope and spirit of the present application are indicated by the claims.

It is to be understood that the present application is not limited to the precise structures described above and illustrated in the accompanying drawings, and various modifications and changes may be made without departing from the scope thereof. The scope of the present application is limited only by the appended claims.

What is claimed is:

1. A rock stratification identification method, comprising:
    acquiring multiple sets of computed tomography (CT) slice images of a rock, wherein each set of the CT slice images comprise a first CT slice image and a second CT slice image, the first CT slice image and the second CT slice image are acquired by scanning a same depth section of the rock, and scanning energy corresponding to the first CT slice image is different form scanning energy corresponding to the second CT slice image;

determining multiple dual energy indices of the rock according to the multiple sets of CT slice images; and determining a rock stratification according to the multiple dual energy indices;

wherein for any set of the CT slice images, the determining multiple dual energy indices of the rock according to the multiple sets of CT slice images comprises:

determining a first average CT value of the first CT slice image;

determining a second average CT value of the second CT slice image; and determining a dual energy index of the rock according to the first average CT value and the second average CT value;

wherein the determining the dual energy index of the rock according to the first average CT value and the second average CT value comprises:

determining a difference value between the first average CT value and the second average CT value;

determining an added value of the first average CT value and the second average CT value; and determining the dual energy index of the rock according to the difference value and the added value;

wherein the dual energy index of the rock conforms to the following formula:

$$DEI_i = \frac{CTL_i - CTH_i}{CTL_i + CTH_i + 2000} \times 10^m$$

wherein the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

2. The method according to claim 1, wherein the determining the rock stratification according to the multiple dual energy indices comprises:

determining a dual energy curve according to the multiple dual energy indices; and determining the rock stratification according to the dual energy curve.

3. The method according to claim 2, wherein the determining the rock stratification according to the dual energy curve comprises:

acquiring a rock image of the rock;

determining a boundary value of the rock stratification according to the dual energy curve and the rock image; and determining the rock stratification according to the boundary value of the rock stratification.

4. The method according to claim 3, wherein the determining the boundary value of the rock stratification according to the dual energy curve and the rock image comprises:

determining multiple peak values according to the dual energy curve;

determining multiple grayscale values according to the rock image; and determining the boundary value of the rock stratification according to the multiple peak values and the multiple grayscale values.

5. The method according to claim 3, wherein the method further comprises:

determining a boundary value of a target stratification according to the boundary value of the rock stratification; and determining the target stratification according to the boundary value of the target stratification, wherein the target stratification is stratification where mineral resources are stored.

6. An electrical device, comprising: a processor and a memory;

wherein the memory stores computer-executable instructions; and the computer-executable instructions stored in the memory are executed by the processor to enable the processor to:

acquire multiple sets of computed tomography (CT) slice images of a rock, wherein each set of the CT slice images comprise a first CT slice image and a second CT slice image, the first CT slice image and the second CT slice image are acquired by scanning a same depth section of the rock, and scanning energy corresponding to the first CT slice image is different form scanning energy corresponding to the second CT slice image;

determine multiple dual energy indices of the rock according to the multiple sets of CT slice images; and determine a rock stratification according to the multiple dual energy indices;

wherein for any set of the CT slice images, the determining multiple dual energy indices of the rock according to the multiple sets of CT slice images comprises:

determining a first average CT value of the first CT slice image;

determining a second average CT value of the second CT slice image; and determining a dual energy index of the rock according to the first average CT value and the second average CT value;

wherein the determining the dual energy index of the rock according to the first average CT value and the second average CT value comprises:

determining a difference value between the first average CT value and the second average CT value;

determining an added value of the first average CT value and the second average CT value; and determining the dual energy index of the rock according to the difference value and the added value;

wherein the dual energy index of the rock conforms to the following formula:

$$DEI_i = \frac{CTL_i - CTH_i}{CTL_i + CTH_i + 2000} \times 10^m$$

wherein the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

7. The electrical device according to claim 6, wherein the computer-executable instructions stored in the memory are executed by the processor to further enable the processor to:

determine a dual energy curve according to the multiple dual energy indices; and determine the rock stratification according to the dual energy curve.

8. The electrical device according to claim 7, wherein the computer-executable instructions stored in the memory are executed by the processor to further enable the processor to:
  acquire a rock image of the rock;
  determine a boundary value of the rock stratification according to the dual energy curve and the rock image; and
  determine the rock stratification according to the boundary value of the rock stratification.

9. The electrical device according to claim 8, wherein the computer-executable instructions stored in the memory are executed by the processor to further enable the processor to:
  determine multiple peak values according to the dual energy curve;
  determine multiple grayscale values according to the rock image; and
  determine the boundary value of the rock stratification according to the multiple peak values and the multiple grayscale values.

10. The electrical device according to claim 8, wherein the computer-executable instructions stored in the memory are executed by the processor to further enable the processor to:
  determine a boundary value of a target stratification according to the boundary value of the rock stratification; and
  determine the target stratification according to the boundary value of the target stratification, wherein the target stratification is stratification where mineral resources are stored.

11. A non-transitory computer-readable storage medium stored with computer-executable instructions, and the computer-executable instructions, when executed by a processor, are used to implement the following steps:
  acquiring multiple sets of computed tomography (CT) slice images of a rock, wherein each set of the CT slice images comprise a first CT slice image and a second CT slice image, the first CT slice image and the second CT slice image are acquired by scanning a same depth section of the rock, and scanning energy corresponding to the first CT slice image is different form scanning energy corresponding to the second CT slice image;
  determining multiple dual energy indices of the rock according to the multiple sets of CT slice images; and
  determining a rock stratification according to the multiple dual energy indices;
  wherein for any set of the CT slice images, the determining multiple dual energy indices of the rock according to the multiple sets of CT slice images comprises:
  determining a first average CT value of the first CT slice image;
  determining a second average CT value of the second CT slice image; and
  determining a dual energy index of the rock according to the first average CT value and the second average CT value;
  wherein the determining the dual energy index of the rock according to the first average CT value and the second average CT value comprises:
  determining a difference value between the first average CT value and the second average CT value;
  determining an added value of the first average CT value and the second average CT value; and
  determining the dual energy index of the rock according to the difference value and the added value;
  wherein the dual energy index of the rock conforms to the following formula:

$$DEI_i = \frac{CTL_i - CTH_i}{CTL_i + CTH_i + 2000} \times 10^m$$

wherein the $DEI_i$ is the dual energy index when a depth of the rock is i; the $CTL_i$, is the first average CT value when the depth of the rock is i; the $CTH_i$ is the second average CT value when the depth of the rock is i; and the m is a constant.

* * * * *